United States Patent Office 3,489,725
Patented Jan. 13, 1970

3,489,725
PROCESS FOR THE PREPARATION OF POLY-
IMIDES USING A MELT POLYMERIZATION
TECHNIQUE
Howard Robert Lucas, Danbury, Conn., assignor to
American Cyanamid Company, Stamford, Conn., a
corporation of Maine
No Drawing. Filed Oct. 12, 1965, Ser. No. 495,306
Int. Cl. C08g 20/32
U.S. Cl. 260—78                           8 Claims

ABSTRACT OF THE DISCLOSURE

A method for the preparation of a high solids containing polyimide resinous reaction product of a diprimary diamine and 3,4-dicarboxy-1,2,3,4-tetrahydro-1-naphthalene succinic dianhydride at an elevated temperature in the presence of not more than 40 percent by weight of the total reaction mixture of an organic solvent.

---

The present invention relates to an improved process for the manufacture of polyimide resins, in general, and in particular, those polyimides derived from the interreaction of 3,4-dicarboxy 1,2,3,4-tetrahydro-1-naphthalene succinic dianhydride and a polyamine.

More specifically, my invention comprises a unique means for the preparation of polyimide resins which in some cases at least are fusible and soluble in organic solvents. The method involves preparing polyimide resins direct from the basic reactants without recourse to the formation, isolation and conversion of polyamide acid intermediates as is the current practice at the present state of this art. As an additional unexpected result of the operation of this new method, one is now able for the first time to produce useful polyimides in polymer solids concentrations greater than 60 percent and as high as upwards of 94 percent by weight of usable solids.

Contrasted with known methods of polyimide synthesis which involve a time consuming plurality of steps, employ high solvent concentration methods with solvent comprising 50 to 80 percent of the total reaction mixture and require passage through a polyamide acid resin intermediate, my unique method requires only a simple, yet efficient one step conversion of the reactants enumerated below, in the presence of little or no added solvent, to a usable polyimide resin.

It is an object of the present invention, therefore, to disclose a unique mode of synthesis of polyimide resins which is low cost, high yield, and much abbreviated over the prior art modes of practice.

It is a further object of the present invention, moreover, to present a method for the preparation of polyimides which involves the use of little or conceivably no solvent in the operation of the process.

The polyimides produced according to the operation of the process of the present invention are prepared by interreacting under high temperatures of the order of 110 to 200° C. and preferably about 130° C., a suitable polyamine such as 4,4'-diamino-diphenylmethane and a suitable dianhydride illustratively, 3,4-dicarboxy-1,2,3,4-tetrahydro-1-naphthalene succinic dianhydride for a total reaction time of from 2–5 hrs. When adding the heated dianhydride to the polyamine or vice versa, it should be added rapidly. In most cases, it is preferably accompanied by a small quantity of an organic solvent such as dimethyl acetamide or dimethyl formamide in amount of from 20 to 40 percent by weight of the total reaction mixture. In the said reaction, equimolar amounts of the two reactants may be employed or a slight excess of either if desired.

Since the reactants are both polymerizing and imidizing while they are being admixed and the quantity of solvent employed at best is small, the heated reaction mixture becomes quite viscous and the reaction should be conducted in a heavy duty mixer having high torque such as the well-known sigma mixer or commercially available Banbury mixer.

Alternatively, one may admix a dry blend of both the polyamine and the acid dianhydride first, then add the small quantity of organic solvent which has been preheated to between 130–140° C. A still further alternative would be to add 10 to 20 parts of solvent to each of the two, i.e., polyamine and acid dianhydride and react as otherwise indicated. In any event, the yield of resin solids is as high as previously indicated and while the precise means may be varied, the desired result will be obtained with a considerable savings in time and materials.

When removed from the reactor and cooled to room temperature, the resinous material is, in at least the case of those materials prepared from 3,4-dicarboxy-1,2,3,4-tetrahydro-1-naphthalene succinic dianhydride a glassy material, and is very high in resin solids ranging as high as 94 percent solids or greater, although in most applications a solids level of 60–80 percent is selected for ease of handling, application to substrates, and the like. After removal from the reaction vessel, the product is devolatilized to remove the last traces of water generated during the reaction and any organic solvent which remains, if any. Any suitable equipment for removing volatiles may be employed, such as a vented extruder or a drying oven. If a drying oven is employed, the glassy reaction product is pulverized to a fine powder and placed in the drying oven for a period of time which may range anywhere from ½ to 3 hours, depending upon the nature and amount of solvent employed, but preferably about 1½ hours at 200° C. using dimethyl acetamide as the solvent of choice. This same polyimide polymer is soluble in solvents such as dimethyl sulfoxide, dimethyl acetamide and the like.

The polyimide materials thus produced in the manner depicted in the above paragraph, have been found to be tough hard fusible materials with outstanding thermal and oxidative stability, in addition to their unique qualities of ease of moldability and handling. In this latter regard, these materials are quite unexpectedly superior to present polyimide resin systems which are rather difficult to work with, particularly in molding applications using conventional molding techniques. Hence, the polyimides which may be produced by the operation of the instant process in many instances, have solubility properties which quite apart from their high level of thermal stability render them useful in a multitude of end uses not heretofore practical with past polyimide materials. To mention a few of these concrete applications, one would note particularly encapsulating and coating resins, molding compounds to be admixed with fillers and other various ingredients to comprise molding compositions, adhesives, particularly those employed in the aerospace vehicles, and high temperature applications. Laminating resins in various manifestations where capacity to be dissolved in a solvent is important, may be prepared using these polyimides, particularly where high temperature stable laminates are to be constructed. Surface coatings for aircraft surfaces with frictional heat buildup are contemplated, especially where the solubility of the polyimides renders them capable of removal by dissolution in organic solvents and replacement with ease of handling and application.

These polyimide resins as prepared by my novel method, may, in order to fulfill one or more of the above enumerated use applications, be admixed with or impregnated into various other materials such as glass fibers, wood pulp, chip or flake board, mineral fillers such as clay, hydrated alumina, asbestos, silica and the like, other well-known fillers. They may also be drawn into filaments or fibers and woven into garments having resistance to heat where such end use dictates.

An important component employed in the preparation of the polyimide reaction products of the present invention is the dianhydride of an organic tetracarboxylic acid. Among the many of these which may be employed either alone or in combination in the operation of my novel method are 3,3',4,4'-benzophenone tetracarboxylic dianhydride, 1,2,3,4-cyclopentane tetracarboxylic dianhydride, 2,2-bis(3,4-dicarboxyphenyl)-propane dianhydride, bis(3,4-dicarboxyphenyl)ether dianhydride, cyclobutane dianhydride, 1-methyl 7,8-diphenylbicyclo[2,2,2]-7-octane - 2,3,5,6-tetracarboxylic dianhydride, pyromellitic dianhydride, 1,4,5,8-naphthalene tetracarboxylic dianhydride and the like. The polyimide prepared from reaction of pyromellitic dianhydride with a suitable polyamine can also be prepared by means of my new process with the proviso that as the polymer is converted to the polyimide, it precipitates from solution as a free-flowing damp powder, and may be further dried before use. This behavior does not detract from the utility of the product, however, since this particular polyimide, in this powder form, should be useful for fabrication via the sintering technique that the industry currently uses when working with polyimide resins which cannot be fabricated or formed in any other manner and which have an unusually high (in excess of 550° F.) melting point.

Among the various polyamine reactants useful in my unique mode of preparation of polyimides, one must consider those organic diamines characterized by the formula: $H_2N-R-HN_2$ wherein R the divalent radical, may be selected from the following groups: aromatic, aliphatic, cycloaliphatic, combinations of aromatic and aliphatic groups, heterocyclic groups, and bridged organic radicals wherein the bridge is oxygen, nitrogen, sulfur, silicon, or phosphorus. The preferred R groups in the diamines are those containing at least 6 carbon atoms characterized by benzenoid unsaturation. Such R groups include:

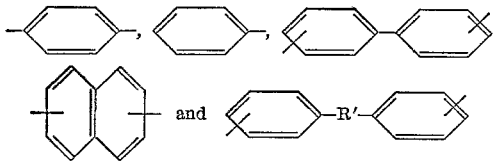

wherein R' is selected from the group consisting of carbon in an alkylene chain having 1–3 carbon atoms, oxygen, silicon in

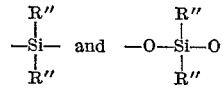

phosphorus in

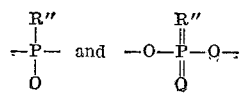

and sulphur alone or in $-SO_2-$ where R'' is an alkyl or aryl. Among the diamines which are suitable for use in the present invention are:

meta-phenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)phosphine oxide;
bis-(4-amino-phenyl)-N-methylamine;
1,5-diamino-naphthalene;
3,3'-dimethyl-4,4'-diamino-biphenyl;
3,3'-dimethoxy benzidine;
2,4-bis(beta-amino-t-butyl)toluene;
bis(para-beta-amino-t-butyl-phenyl)ether;
para-bis(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl)methane;
hexamethylene diamine;
heptamethylene diamine;
octamethylene diamine;
nonamethylene diamine;
decamethylene diamine;
3-methyl-heptamethylene diamine;
4,4'-dimethylheptamethylene diamine;
2,11-diamino-dodecane;
1,2-bis-(3-amino-propoxy)ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
$H_2N(CH_2)_3O(CH_2)_2O(CH_2)_3NH_2$;
$H_2N(CH_2)_3(CH_2)_3NH_2$;
$H_2N(CH_2)_3N(CH_3)(CH_2)_3NH_2$;

and mixtures thereof may be employed within the concept of my invention. Obviously, these diamines may be used either singly or in combination with one another, since the amounts will be calculated stoichiometrically so as to provide substantially one mole of diamine per mole of dianhydride. If it may be desired, however, one may vary the relative amounts of the diamine and dianhydride reactants without departing from the spirit or scope of my invention.

In order that the process concept of the present invention be more elaborately depicted, and hence, more readily understood, applicant presents the following concrete embodiment of his invention in the form of specific examples of the operation of his new process of polyimide preparation. All parts of ingredients described are intended to be parts by weight unless otherwise indicated.

The examples following are set forth simply to comply with the legal requirement for concrete description of the mode of operation of the process and any specific enumeration of detail contained therein should not be interpreted as a limination on the scope of the inventive concept which underlies the invention as generally described above. For any question of interpretation of the relative scope of the patent protection afforded to the invention, attention may only be directed to the several claims appended thereto.

EXAMPLE 1

39.654 parts of 4.4' - diamino-diphenylmethane was placed in a reaction vessel and heated to 150° C. under $N_2$. Next, 60.353 parts of 3,5-dicarboxy - 1,2,3,4 - tetrahydro - 1 - naphthalene succinic dianhydride is added rapidly to the molten diamine alone with 5 parts dimethylformamide and stirred until mixing becomes impossible. At this point, temperature is increased with water of condensation being given off. At 200° C. vacuum is applied for 3 hours and the last traces of water and dimethylformamide are removed. The resin in its final form which has an inherent viscosity of 0.16 using 0.5% solids in dimethyl formamide is molded by conventional technique.

EXAMPLE 2

218 parts of pyromellitic dianhydride and 143 parts of dimethylacetamide were mixed in a sigma mixer at 130° C. Then 198 parts of 4,4'-diamino-diphenyl methane was added and mixing continued. After approximately 5 minutes, polymer appeared to be precipitating from solution. After 1 hour and 43 minutes, viscosity showed a drastic increase reaching a peak, 8 minutes later, followed by a more drastic decrease. The resulting polymer was in the form of a fine powder, no longer in suspension. The powder was stripped of dimethylacetamide by heating 3 hours at 200° C. under vacuum. The resulting product was a polyimide reaction product of pyromellitic dianhydride and 4,4'-diamino-diphenyl methane.

EXAMPLE 3

300.262 parts of 3,4 - dicarboxy - 1,2,3,4 - tetrahydro-1-naphthalene succinic dianhydride was placed in a sigma mixer under $N_2$ with 215 parts of dimethylacetamide at 130° C. whereupon 198.27 parts of 4,4'-diamino-diphenylmethane was added rapidly. The exotherm which occurred, increased the temperature to 137° C. with water from imidization being given off. After 2 hours the maximum viscosity was reached, polymer was removed from mixer. The polymer became glassy at room temperature and was ground to a fine particle size in a Quaker city mill. The final step involved removal of the remaining solvent and the last traces of water at 200° C. for 2 hours under vacuum. Inherent viscosity measured in dimethyl formamide at 0.5% solids was 0.33. The Flexual Strength at 23° C. was 14,100, and Flexual Modulus at 23° C. was 500,000.

EXAMPLE 4

150.14 parts of 3,4 - dicarboxy - 1,2,3,4 - tetrahydro-1-naphthalene succinic dianhydride, 161.13 parts of 3,3', 4,4' - benzophenone dianhydride and 216 grams of dimethylacetamide were mixed in a sigma mixer under $N_2$ at 130° C. Then 198.27 parts of 4,4'-diamino-diphenylmethane was added and mixing continued. After 55 minutes, an extreme build-up in viscosity was noted. After a total time in the mixer of 2 hours, the polymer was removed and ground to a fine powder at room temperature. Any solvent and traces of water were removed at 200° C. for 2 hours under vacuum. The product in final form was molded at 320° C. giving a transparent molding.

EXAMPLE 5

30.03 parts by weight of 3,4 - dicarboxy - 1,2,3,4-tetrahydro-1-naphthalene succinic dianhydride was thoroughly admixed with 19.83 parts by weight of 4,4' - diamino-diphenylmethane. The mixture was placed in an oven at 200° C. for 3 hours. The powder formed a melt and water vapor was liberated over the 3 hour reaction time. The product was a glassy material which could be readily ground. The material was pressed between plates to form a clear, tough sheet. The Infra-red spectrum showed the material to be the desired polyimide.

EXAMPLE 6

915.4 parts of 4,4' - diamino - diphenylmethane was thoroughly admixed with 1394 parts of 3,4-dicarboxy 1,2,3,4 - tetrahydro - 1 - naphthalene succinic dianhydride. The above charge was then added to 990 parts of dimethyl acetamide at 130° C. in a sigma mixer with agitation. Mixing was continued for 2 hours under $N_2$ with water of condensation given off. After 2 hours, the polymer was removed from the mixer. The polymer, at room temperature, in the form of a glass, was ground to a fine powder, and dried in an oven at 200° C. under vacuum for 2 hours to remove solvent and small traces of water. Inherent viscosity measured in dimethylformamide at 0.5% solids is 0.29.

EXAMPLE 7

337.3 parts of 3,4 - dicarboxy - 1,2,3,4 - tetrahydro-1-naphthalene succinic dianhydride was slurried with 120 parts of dimethylacetamide at 120° C. in a sigma mixer. To the slurry was added 222.7 parts of 4,4' - diamino diphenylmethane dissolved in 120 parts of dimethylacetamide at 110° C. The temperature of the reaction rose to 130° C. with the elimination of water of condensation. Mixing was continued for 2 hours under $N_2$. After which the polymer was removed and ground to a fine powder. The removal of solvent and traces of water was accomplished by vacuum drying at 200° C. for 2 hours. Inherent viscosity was measured in dimethylformamide at 0.5% solids=0.26.

I claim:
1. A method for the preparation of a high solids containing polyimide resinous reaction product of a diprimary diamine and 3,4-dicarboxy-1,2,3,4-tetrahydro-1-naphthalene succinic dianhydride which comprises:
   (I) heating a mixture of a diprimary amine and said acid dianhydride in the presence of not more than 40 percent by weight of the total reaction mixture of an organic solvent to a temperature in excess of 110° C. with constant agitation to simultaneously polymerize and imidize the reactants,
   (II) holding said reaction mixture at said temperature until the free acid radicals have been removed and volatiles evaporated therefrom and recovering the said polyimide.

2. A method for the preparation of a high solids containing polyimide resinous reaction product of a diprimary diamine and 3,4-dicarboxy-1,2,3,4-tetrahydro-1-naphthalene succinic dianhydride which comprises:
   (I) heating a mixture of a diprimary diamine and 3,4-dicarboxy-1,2,3,4-tetrahydro-1-naphthalene succinic dianhydride in the presence of not more than 40 percent by weight of the total reaction mixture of an organic solvent, to a temperature of from 110 to 200° to simultaneously polymerize and imidize the reactants,
   (II) holding said reaction mixture at said temperature until the free acid radicals have been removed and volatiles evaporated therefrom and recovering the said polyimide.

3. A non solvent method for the preparation of a high solids containing polyimide resinous reaction product of a diprimary diamine and 3,4-dicarboxy-1,2,3,4-tetrahydro-1-naphthalene succinic dianhydride which consists of:
   (I) heating a mixture of a diprimary diamine and 3,4-dicarboxy-1,2,3,4-tetrahydro-1-naphthalene succinic dianhydride to a temperature in excess of 110° C. to simultaneously polymerize and imidize the reactants,
   (II) holding said reaction mixture at said temperature until the free acid radicals have been substantially removed to produce the desired polyimide.

4. A method for the preparation of a high solids containing polyimide resinous reaction product of a diprimary diamine and 3,4-dicarboxy-1,2,3,4-tetrahydro-1-naphthalene succinic dianhydride which comprises:

(I) heating a mixture of a diprimary diamine and 20 to 40 percent by weight of the total reaction mixture of an organic solvent to a temperature in excess of 110° C. with agitation, (II) adding rapidly said acid dianhydride reactant with continued agitation of the reaction mixture, and (III) holding said reaction mixture at said temperature until the free acid radicals have been removed, volatiles evaporated therefrom and recovering the said polyimide.

5. A method for the preparation of a polyimide resin reaction product according to claim 4, wherein the polyamine and organic solvent premix are preheated to a temperature of 130° C. before the acid dianhydride reactant is added.

6. A method for the preparation of a high solids containing polyimide resinous reaction product of a diprimary diamine and 3,4-dicarboxy-1,2,3,4-tetrahydro-1-naphthalene succinic dianhydride which comprises:

(I) heating a mixture of 3,4-dicarboxy-1,2,3,4-tetrahydro-1-naphthalene succinic dianhydride and 20 to 40 percent by weight of the total reaction mixture of an organic solvent to a temperature in excess of 110° C. with agitation, (II) adding rapidly the diprimary diamine with continued agitation of the reaction mixture, and (III) holding said reaction mixture at said temperature until the free acid radicals have been substantially completely removed from the reaction mixture, volatiles evaporated therefrom and recovering the polyimide.

7. A method for the preparation of a polyimide resin reaction product according to claim 6 wherein the dianhydride of the organic tetracarboxylic acid and organic solvent premix are preheated to a temperature of 130° C. before the polyamine reactant is added.

8. A method for the preparation of a high solids containing resinous reaction product of a diprimary diamine and 3,4-dicarboxy-1,2,3,4-tetrahydro-1-naphthalene succinic dianhydride which comprises:

(I) dry blending the diprimary diamine and said dianhydride, (II) separately heating a quantity of solvent equal to 20 to 40 percent by weight of the total reaction mixture to a temperature in excess of 110° C., (III) adding the dry blend of reactants from step (I) to the preheated solvent with agitation, (IV) holding the reaction mixture at the temperature in excess of 110° C. until the free acid radicals have been removed from the reaction mixture and recover the polyimide.

References Cited

UNITED STATES PATENTS 3,342,774    9/1967    Hoegger _____ 260—78

FOREIGN PATENTS 570,858    7/1945    Great Britain.

HAROLD D. ANDERSON, Primary Examiner

U.S. Cl. X.R.

117—161; 161—227; 260—37, 47, 65

UNITED STATES PATENT OFFICE
CERTIFICATE OF CORRECTION

Patent No. 3,489,725 January 13, 1970

Howard Robert Lucas

It is certified that error appears in the above identified patent and that said Letters Patent are hereby corrected as shown below:

Column 3, lines 56 to 58, the second R group reading

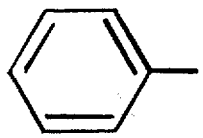 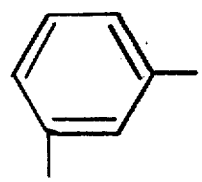

Column 4, line 46, "$H_2N(CH_2)_3(CH_2)_3NH_2$" should read -- $H_2N(CH_2)_3S(CH_2)_3NH_2$ --; line 75, "thereto" should read -- hereto --. Column 5, line 5, "alone" should read -- along --.

Signed and sealed this 17th day of November 1970.

(SEAL)
Attest:

EDWARD M. FLETCHER, JR.
Attesting Officer

WILLIAM E. SCHUYLER, JR
Commissioner of Patents